United States Patent [19]

Barber

[11] 4,169,351

[45] Oct. 2, 1979

[54] ELECTROTHERMAL THRUSTER

[75] Inventor: Brian C. Barber, Aldershot, England

[73] Assignee: The Secretary of State for Defence in Her Britannic Majesty's Government of the United Kingdom of Great Britain and Northern Ireland, London, England

[21] Appl. No.: 845,093

[22] Filed: Oct. 25, 1977

[30] Foreign Application Priority Data

Oct. 25, 1976 [GB] United Kingdom ............... 44306/76

[51] Int. Cl.² .............................................. F02K 9/00
[52] U.S. Cl. .................................... 60/203; 60/200 R
[58] Field of Search ............. 60/39.46 M, 200 R, 203; 219/10.47, 10.51, 10.65

[56] References Cited

U.S. PATENT DOCUMENTS

| | | | |
|---|---|---|---|
| 2,616,022 | 10/1952 | Arnavel | 219/10.51 |
| 3,465,522 | 9/1969 | Anderson et al. | 219/10.51 |
| 3,518,410 | 6/1970 | Dillarstone | 219/10.51 |
| 3,956,885 | 5/1976 | Davis et al. | 60/39.46 M |

FOREIGN PATENT DOCUMENTS 2535520  7/1976  Fed. Rep. of Germany ............. 60/203

Primary Examiner—Louis J. Casaregola
Attorney, Agent, or Firm—Pollock, Vande Sande and Priddy

[57] ABSTRACT

An electrothermal thruster includes an electrical heater comprising a copper pipe surrounded by a co-axial tubular copper jacket, and a resistance heated chamber cooperating to heat and decompose liquid fuel which flows into the pipe to effect a gaseous discharge through a propelling nozzle. The jacket has a closed end soldered to the pipe which is supported from the open end by wires. The pipe, jacket and wires constitute the secondary winding of a transformer. The primary winding is of toroidal form round an annular core disposed co-axially about the pipe within the jacket. Induced current in the secondary causes heating of the pipe in turn heating fluid therein.

6 Claims, 4 Drawing Figures

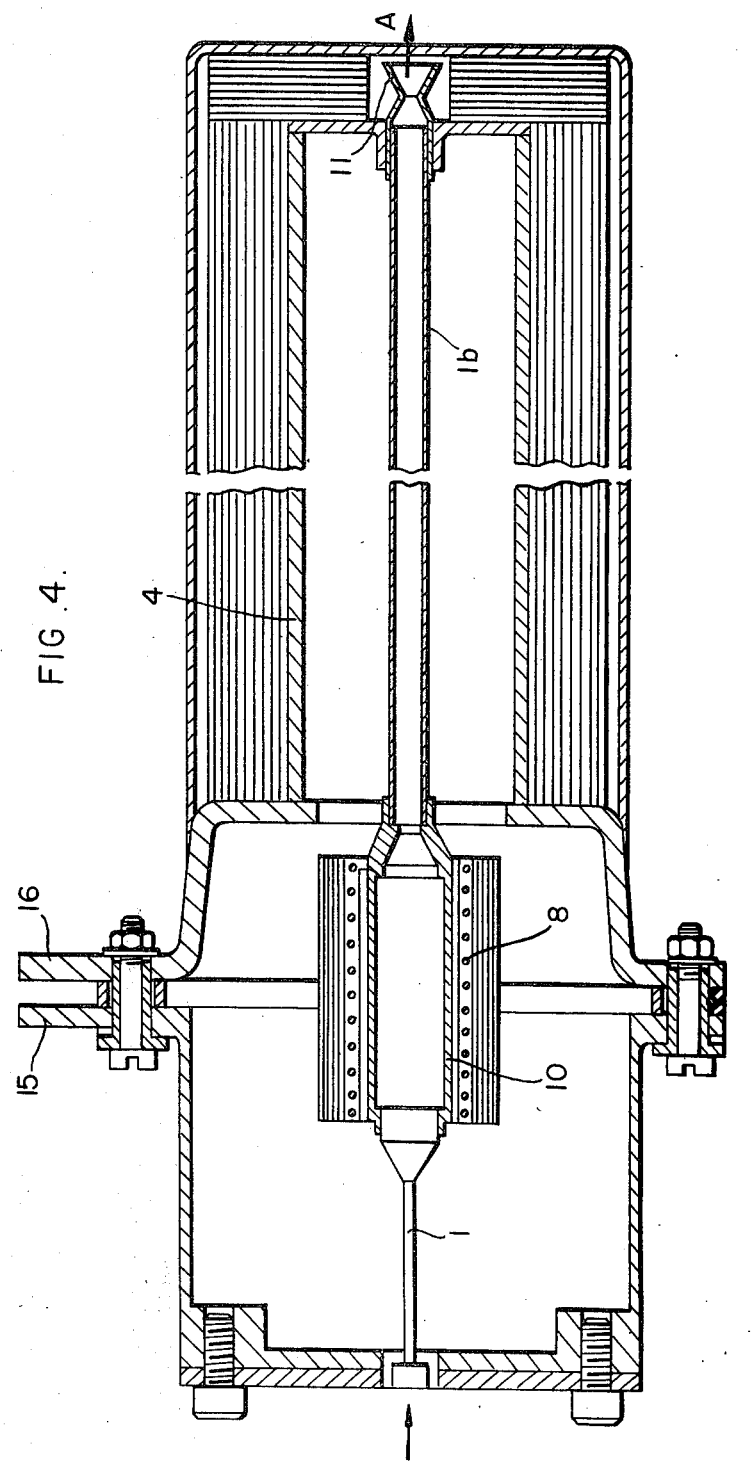

ELECTROTHERMAL THRUSTER

The present invention relates to electric heaters and particularly, though not exclusively, to apparatus for heating a stream of fluid such as, for example, a gas thruster used for controlling the attitude of an artificial space satellite.

Known means for electrically heating a fluid flowing through a pipe include resistance heaters comprising electrical windings in thermal contact with the pipe and induction heaters.

Chemical or thermal incompatibility between resistance heater elements and electrical insulation surrounding the elements and high temperature breakdown of the insulation may be major disadvantages in some applications of resistance heaters, particularly in the aerospace field. The weight penalty associated with such insulation is a further disadvantage.

Electrical induction heaters are only suitable for applications where low electrical power transfer is tolerable.

According to the present invention, an electric heater comprises a transformer having a secondary winding which includes a duct for conveying and heating a fluid and an electrically conductive element connected to the inlet and outlet ends of the duct.

In a preferred form of the invention, the electrically conductive element comprises a tubular member surrounding the duct.

In one embodiment of the preferred form of the invention the transformer has a primary winding which surrounds the duct and which may be enclosed by the conductive element.

The invention also provides a electrothermal thruster including an electric heater as previously set out.

Embodiments of the invention will now be described by way of example only with reference to the accompanying drawings of which:

FIG. 4 is a similar view to FIG. 3 of a modified electrothermal thruster.

Figure 1:
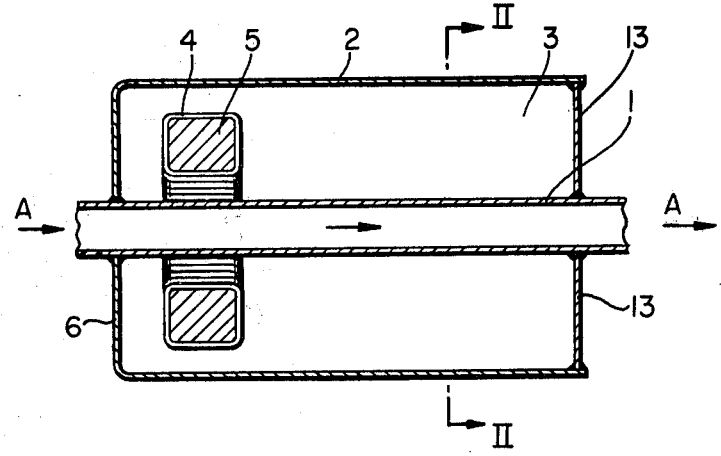
FIG. 1 is a sectional side elevation of an electric heater.
Figure 2:
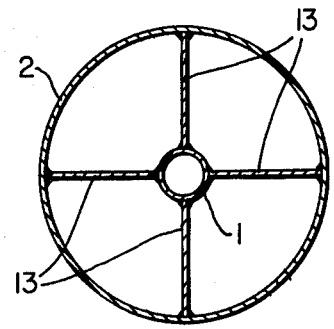
FIG. 2 is a cross sectional view on the line II—II of the heater of FIG. 1.

The electric heater shown in FIGS. 1 and 2 includes a copper pipe 1 and a tubular copper jacket 2 surrounding the pipe and co-axial with it. The jacket 2 has a closed end 6 soldered to the pipe 1 and an open end which supports the pipe by means of four wires 13 soldered to the jacket 2 as may be seen in FIG. 2. The pipe 1, the jacket 2 and the wires 13 together comprise the secondary winding of a transformer. The primary winding 4 of the transformer comprises copper wire wound in toroidal form around an annular ferrite core 5 disposed co-axially about the tube 1 within the jacket 2.

The primary winding 4 is connected to an electrical power source by leads (not shown) which extend through the jacket 2 and which are insulated therefrom.

In operation current from the power source flows in the primary winding 4 of the transformer and induces a current in the secondary winding causing the pipe 1 to heat up and transfer heat to fluid flowing through the pipe in the direction A in FIG. 1. The wires 13 are of sufficiently small diameter to give a zero or low thermal gradient along the wires during operation.

Figure 3:
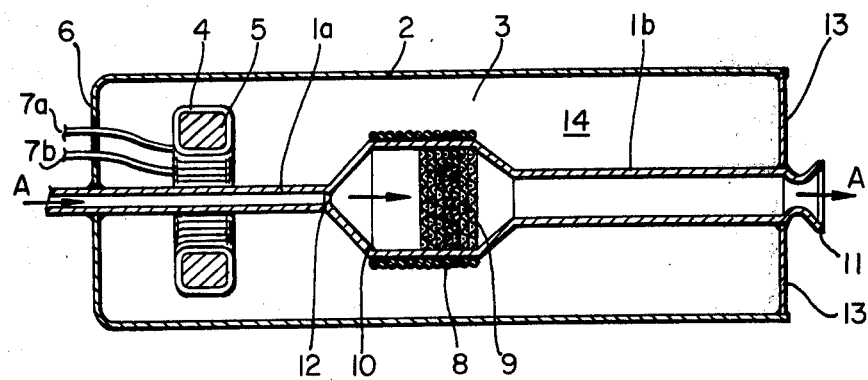
FIG. 3 is a sectional side elevation of an electrothermal thruster, or resistojet, for controlling the attitude of an artificial space satellite.

The resistojet of FIG. 3 comprises a primary fluid heater and a secondary fluid heater which is basically similar to the heater of FIG. 1.

The primary heater includes a chamber 10 having an inlet pipe 1a and an outlet pipe 1b. An electrical resistance heater coil 8 is wound around the chamber 10 which contains a stack of platinum gauze 9.

The inlet pipe is connected to feed a thermally decomposable liquid such as liquid hydrogen or hydrozine into the chamber 10 and the gauze 9 serves to transfer heat to the liquid which is thus converted to gas which forms a propellant for the resistojet and flows to the outlet pipe 1b.

The outlet pipe 1b forms part of the secondary heater and is surrounded by a tubular jacket 2 as in FIG. 1. The jacket 2 also encloses the chamber 10 and the inlet pipe 1a, to which it is connected by an end plate 6. The jacket 2 supports the downstream end of the outlet pipe 1b, which terminates in a propelling nozzle 11, by eight wires 13 twisted in pairs. The wires are connected at their outer ends to the jacket 2 and extend around the pipe 1b adjacent to the nozzle 11.

The jacket 2, the chamber 10, the pipes 1a, 1b and the wires 13 together comprise the secondary winding of a transformer. The jacket 2 also encloses the primary winding 4 of the transformer, of similar construction to that shown in FIG. 1. The primary winding is connected to an electrical power source by a pair of leads 7a, 7b which extend through holes in the end plate 6 and which are insulated therefrom.

In operation, the primary heater is connected to an electrical supply and transfers heat via the gauze 9 so as to decompose liquid propellant flowing from the tube 1a. The secondary heater is also connected to an electrical supply whereupon current flows in the transformer circuits and heats up the pipe 1b. Heat is transferred to the gas which expends and issues from the nozzle 11 to provide a thrust force.

The diameters of the wires 13 are chosen to give a zero or low thermal gradient along the wires as in the embodiment of FIG. 1.

Characteristics of a typical resistojet as described above are

| | |
|---|---|
| Operating current | 60 amps |
| Power supply | 160 watts, 50 kHz |
| Overall Efficiency | 50% |
| Specific Impulse | 305 sec |
| Thrust | 71 mN |
| Mass flow rate | 23.5 mgm sec$^{-1}$ |

In a modification, the end plate 6 may be replaced by, for example, wires similar to the wires 13 to provide a further thermal barrier between the jacket and the duct.

The resistojet shown in FIG. 4 is generally similar to that of FIG. 3, the same reference numerals indicating corresponding components. The essential difference is that the primary winding (not shown) of the transformer is external together with a secondary winding of substantially conventional form (not shown) which is electrically connected to include the jacket 2, the pipes 1a, 1b and the chamber 10, which comprise the secondary heater, by way of terminals 15, 16. This arrangement can be advantageous in enabling the use of more readily available items. For instance, a toroidal primary winding may not be necessary and high temperature heat insulation for transformer windings can be avoided.

I claim:

1. An electrothermal thruster comprising an electric heater having a transformer with a secondary winding constituted by a duct for conveying and heating a fluid, and an electrically conductive element electrically connected to the inlet and outlet ends of the duct;

a chamber connected to a supply of thermally decomposable liquid propellant and to the inlet end of the duct and provided with an electrical resistance heater arranged to heat the chamber so as to decompose the liquid; and, a propelling nozzle connected to the outlet end of the duct.

2. An electrothermal thruster according to claim 1 in which the electrically conductive element comprises a tubular member disposed to surround the duct.

3. An electrothermal thruster according to claim 1 in which the transformer has a primary winding disposed to surround the duct.

4. An electrothermal thruster according to claim 3 in which the primary winding is wound in toroidal form.

5. An electrothermal thruster according to claim 3 further comprising an electrically conductive element of tubular form disposed to surround the primary winding.

6. An electrothermal thruster according to claim 1 further comprising a heat exchanger within the chamber arranged to transfer heat to the liguid.